Nov. 24, 1936.                C. C. KINKER                2,061,661
                    COVER FOR MOLTEN GLASS CONTAINERS
                Original Filed Aug. 15, 1934    3 Sheets—Sheet 1
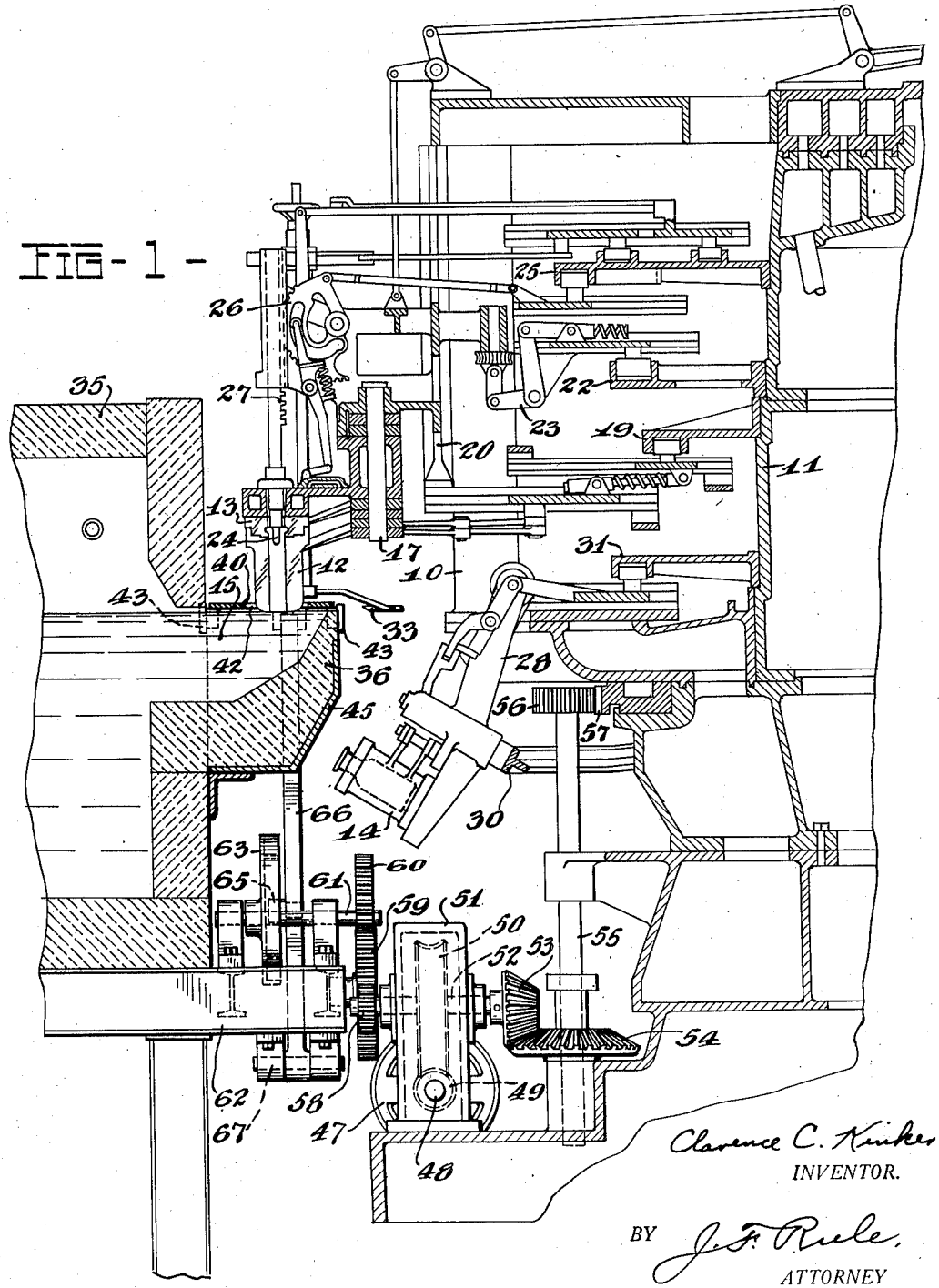
INVENTOR.
Clarence C. Kinker
BY J. F. Rule,
ATTORNEY

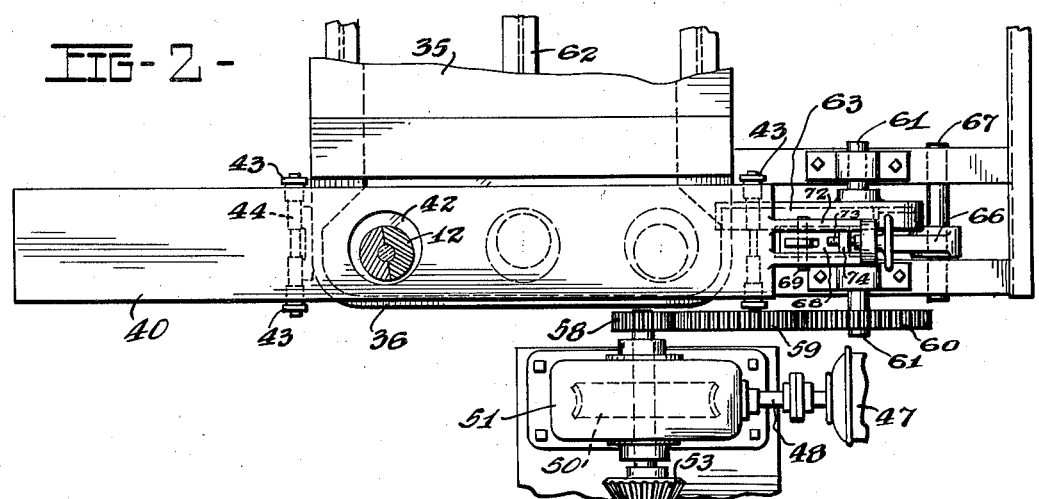
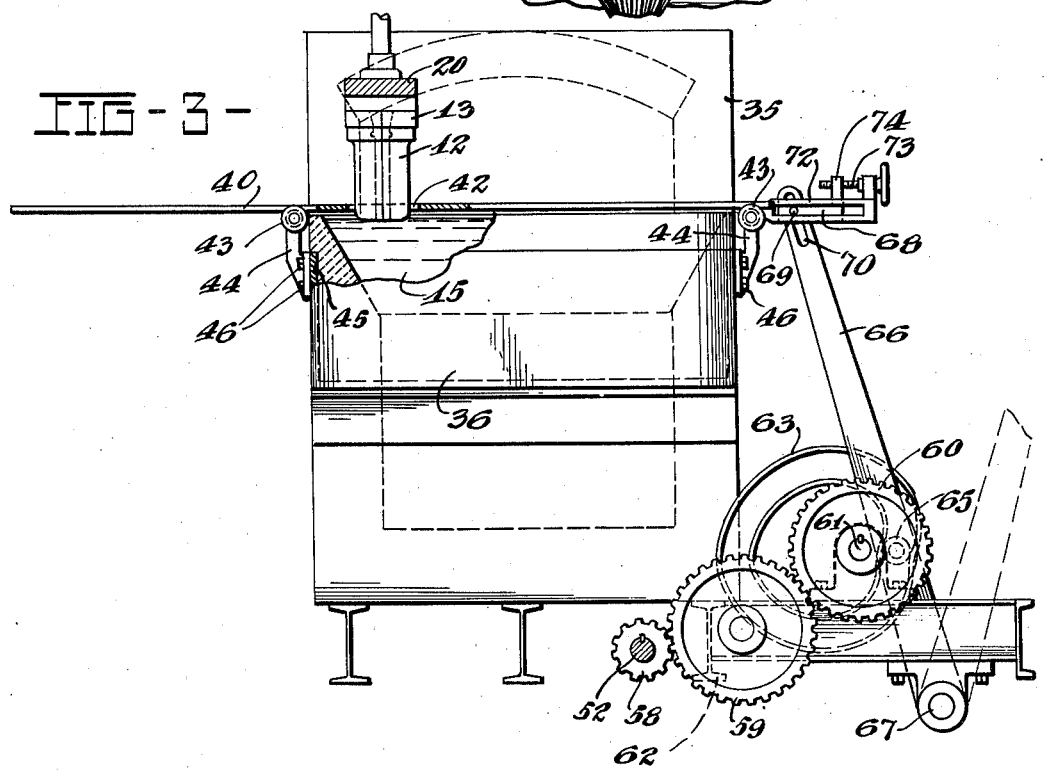

Nov. 24, 1936.                C. C. KINKER                2,061,661
COVER FOR MOLTEN GLASS CONTAINERS
Original Filed Aug. 15, 1934     3 Sheets-Sheet 3
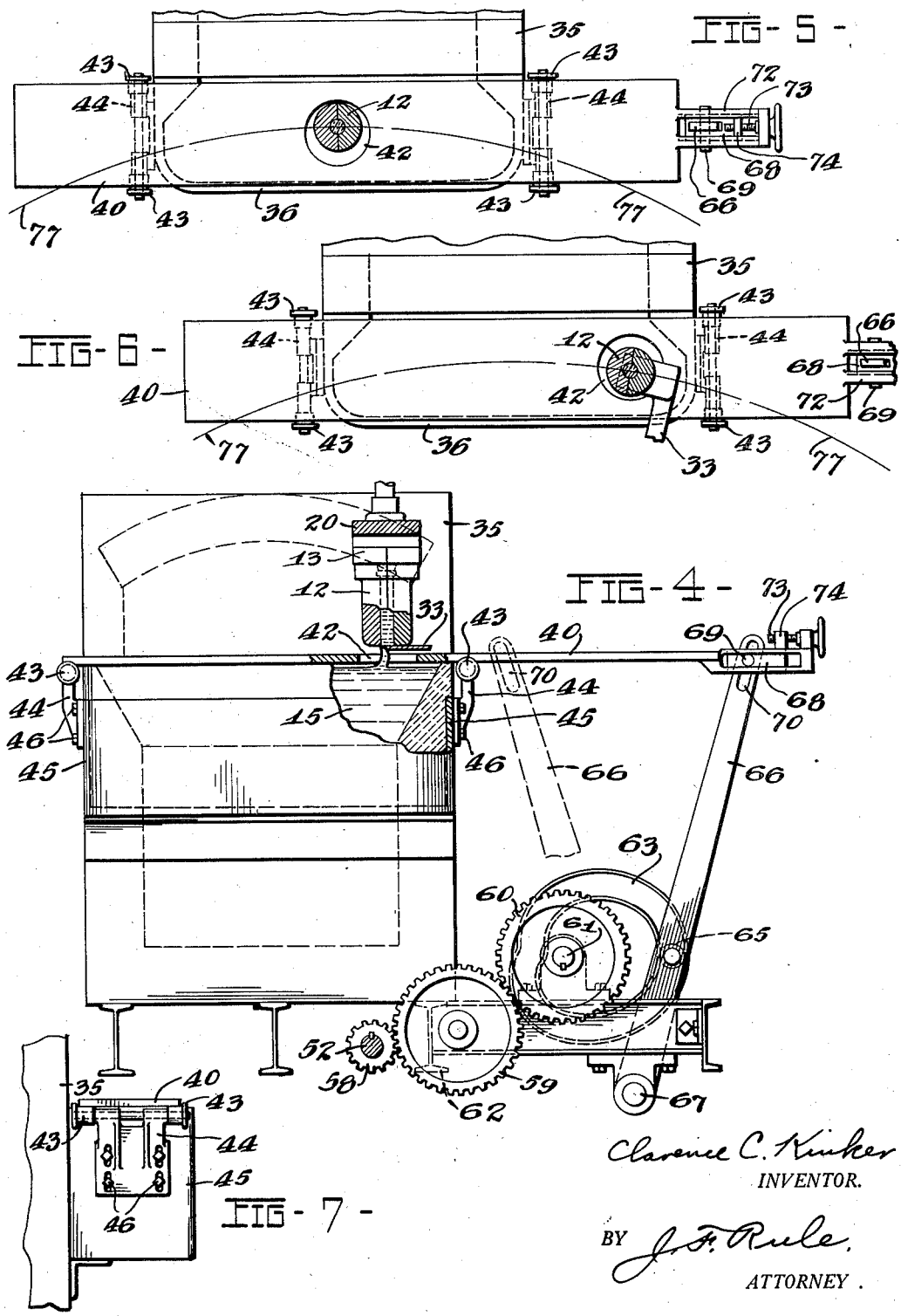
Clarence C. Kinker
INVENTOR.
BY J. F. Rule,
ATTORNEY.

Patented Nov. 24, 1936

2,061,661

UNITED STATES PATENT OFFICE 2,061,661

COVER FOR MOLTEN GLASS CONTAINERS

Clarence C. Kinker, Alton, Ill., assignor to Owens-Illinois Glass Company, a corporation of Ohio Application August 15, 1934, Serial No. 739,872
Renewed May 14, 1936

8 Claims. (Cl. 49—5)

My invention relates to an apertured cover for a molten glass container from which charges of glass are gathered for use in the manufacture of glass articles. In its preferred form, it is adapted for use with apparatus including a glass forming machine of the suction gathering type in which the molds are caused to travel periodically and in succession over a supply body or pool of molten glass in a tank or container, the molds being brought into dipping contact with the glass and gathering their charges by suction. With apparatus of this type in general use, a gathering area of considerable extent is exposed to the atmosphere to accommodate the horizontal travel of the mold during the gathering operation. This results in a great loss of heat from the exposed glass which is at a very high temperature, produces unevenness in the temperature of the glass entering the molds, necessitates the provision of means for reheating the glass, increases fuel costs, and is objectionable for various other reasons.

An object of the present invention is to overcome this objection by the provision of means for greatly reducing the area which is exposed during and between gathering operations.

More specifically, an object of the invention is to prevent heat loss at the gathering area by the provision of a cover plate overlying the gathering area and having an opening through which the mold is projected for gathering its charge of glass, and means for causing the opening to advance with the traveling mold so that the area of said opening may be reduced to a minimum.

A further object of the invention is to provide a simple and practical construction including automatic means operating in synchronism with the movements of the mold carriage, to reciprocate the cover plate, causing it to advance with each mold and then return and advance with the next succeeding mold.

Other objects of the invention will appear hereinafter.

Referring to the accompanying drawings:

Fig. 1 is a fragmentary sectional elevation of apparatus including a suction gathering machine, a furnace, a cover plate for the forehearth, and mechanism for reciprocating said plate.

Fig. 2 is a fragmentary plan view showing the reciprocating cover plate and its operating mechanism.

Fig. 3 is a front elevation of the same, parts being shown in section.

Fig. 4 is a view similar to Fig. 3 but showing the parts in a different position.

Figs. 5 and 6 are plan views showing the reciprocating cover plate in different positions.

Fig. 7 is a fragmentary end elevational view of the forehearth and cover.

The invention is herein illustrated as used in connection with a standard Owens type suction gathering machine, one head or unit of which is shown in sectional elevation in Fig. 1. As this machine is of well known construction and forms part of the present invention only as combined with other mechanism, only a brief general description of the machine need be given. It may comprise, as usual, a mold carriage 10 which is rotated continuously about a stationary column 11, said carriage having mounted thereon an annular series of mold groups each including a body blank mold 12, a neck mold 13 in register therewith, and a finishing mold 14, each said mold comprising partible sections. The blank mold and neck mold together form a parison mold 20 which, as the mold carriage travels, is periodically brought over a pool 15 of molten glass and while over the pool is dipped into sealing contact therewith and gathers its charge of glass by suction. The blank and neck mold sections are mounted to swing about a pivot pin 17 for opening and closing the molds, these movements being under the control of a stationary cam 19. The molds 12 and 13 are carried on a dip head 20, lifted and lowered by means of a stationary cam 22 operatively connected through mechanism 23 with the dip head. A plunger 24 which projects into the mold for forming an initial blow opening, is lifted and lowered under the control of a cam 25 operating through a gear segment 26 and rack 27. The finishing mold 14 is carried on a frame 28 which is supported on a stationary cam track 30 and by which the finishing mold is swung upward to enclose a parison suspended from the neck mold after the blank mold 12 has opened, the opening and closing movements of the finishing mold being controlled by a stationary cam 31. When a charge of glass has been drawn by suction into the blank mold and the latter lifted from the pool, a knife 33 is swung horizontally across the bottom of the mold to sever the tail of glass which unites the glass in the mold with that in the pool.

As herein shown, a tank furnace 35 maintains a continuous supply of molten glass in a forehearth extension 36, providing a pool of glass 15 at the gathering area. In order to reduce the area of glass exposed at the gathering zone, the present invention provides a cover plate 40 which covers substantially the entire surface area of glass within the forehearth, except an opening 42 in the plate of a size to accommodate the mold as it dips in the glass.

The cover plate is caused to reciprocate by the mechanism which will presently be described so that the opening 42 advances with each mold 12 as the latter travels over the forehearth, thereby permitting said opening to be reduced to approximately the diameter of the mold. The cover plate is carried on supporting and guiding rolls 43 which permit horizontal reciprocation of the plate in the direction of its length. The rolls 43 are carried on brackets 44 (see Figs. 4 and 7) which, as shown, are mounted on a metal casing 45 which supports the forehearth 36. The brackets 44 are adjustable vertically and held in adjusted position by clamping bolts 46.

An electric motor 47 serves to drive the mold carriage and also to actuate the cover plate 40. The motor shaft 48 carries a worm 49 which drives a worm gear 50 journaled in a gear box 51. The worm gear is keyed to a shaft 52 which has a pinion 53 keyed to the outer end thereof, said pinion meshing with a bevel gear 54 on a vertical shaft 55. On the upper end of the shaft 55 is a pinion 56 which drives the usual ring gear 57 on the mold carriage, thereby continuously rotating the carriage.

The shaft 52 has keyed to its inner end a pinion 58 which operates through an idler gear 59 to drive a gear 60 keyed to a cam shaft 61 journaled in bearings on the framework 62 which supports the furnace. A cam disk 63 keyed to the shaft 61 is formed with a cam groove or track on which runs a roll 65 carried on a rock arm 66 which rocks about a pivot 67 at the lower end of said arm. The rock arm has a driving connection at its upper end with the cover plate 40, said connection including an adjusting block 68 carrying a pin 69 which engages a slot 70 in the arm 66. The block 68 is mounted for adjustment lengthwise in guides 72 on the cover plate, adjustment being effected by means of an adjusting screw 73 threaded through a lug 74 on the block 68.

The cover plate is reciprocated horizontally in the direction of its length by the mechanism just described including the cam operated rock arm 66. It will be noted that there is an interconnection between the mold carriage and the cover plate 40 through the driving connections or gearing extending from the motor 47 to the mold carriage and cover plate, so that the latter is reciprocated in a definite timed relation to or synchronism with the movements of the mold carriage. The gearing is so proportioned and arranged that the cover plate is advanced across the gathering area at substantially the same speed as the mold, and with the opening 42 in register with the mold. Said opening is made of somewhat larger diameter than the mold to provide clearance and also to accommodate the movement of the mold in a curved path or arc 77 (Figs. 5 and 6) which represents the path of the mold axis about the axis of the mold carriage.

Fig. 2 illustrates the position of the cover plate and also the position of the mold relative thereto as the mold is brought over the gathering area and is lowered to contact with the glass. Fig. 5 illustrates the relative positions of the parts when the mold has reached the center of the gathering area, and Figs. 4 and 6 show the parts at the completion of the gathering operation, the mold being lifted above the cover plate while the knife 33 severs the glass. As the mold advances beyond the Fig. 4 position, the cover plate is returned by the cam 63 and the opening 42 brought into register with the next succeeding mold.

It will be understood that although the invention is herein shown as used with automatic suction gathering molds, it may also be adapted for use with other forms of gathering apparatus. Various other modifications may be resorted to within the spirit and scope of my invention as defined in the appended claims.

I claim:

1. The combination of a container for molten glass presenting a gathering area, a cover plate extending over said area, said cover plate having an opening therein through which an implement may be projected into the glass, and automatic means for periodically reciprocating the cover plate horizontally.

2. The combination of a tank to contain molten glass, said tank having a forehearth extension providing a gathering area, a cover plate overlying the extension and having an opening therein over the glass in the forehearth, and automatic means for periodically reciprocating the cover plate.

3. The combination of a container for molten glass presenting a surface gathering area of glass, a cover plate extending over said area and provided with an opening therethrough, a glass gathering implement, automatic means for projecting said implement through said opening into gathering relation to the glass and causing the implement to advance across said area, and automatic means for periodically reciprocating the cover plate and causing said opening to advance across the gathering area in synchronism with the movements of said gathering implement.

4. The combination of a container for molten glass, a cover for said container, said cover having an opening therethrough, a mold carriage, a mold thereon, means for driving the carriage and causing the mold to periodically project through said opening and traverse said gathering area, and means for periodically reciprocating the cover and thereby causing said opening to advance with the mold across the gathering area.

5. The combination of a container for molten glass, a cover plate for said container, said cover plate having an opening therethrough, a mold carriage, a mold thereon, means for driving the carriage and causing the mold to periodically project through said opening and traverse said gathering area, and power transmitting mechanism interconnecting said cover plate and mold carriage and operable to reciprocate said plate in synchronism with the movements of the mold carriage and cause said opening to advance with the mold across the gathering area.

6. The combination with a machine for forming glass articles, said machine comprising a rotating mold carriage and a mold thereon, of a container for molten glass presenting a gathering area, a cover plate mounted independently of the mold carriage and extending over said area, said plate having an opening therethrough, a motor, and driving connections extending from the mold carriage and said cover plate to the motor, and through which the motor is operable to rotate said carriage and to reciprocate the cover plate in timed relation to the movements of the mold across the gathering area and cause said opening to advance with the mold and in register therewith across the gathering area.

7. The combination of a container for molten glass presenting a surface gathering area of glass, a cover plate extending over said area and provided with an opening therethrough, a glass gathering implement, means for causing the implement to travel in a closed circular path extending across the gathering area, automatic means for projecting said implement through said opening and holding it in gathering relation to the glass while it advances across said area, and automatic means for reciprocating the cover plate and thereby causing said opening to advance with and in register with said implement and then return.

8. The combination of a container for molten glass presenting a gathering area, a mold carriage, a series of molds thereon, means for rotating the carriage and thereby causing the molds periodically and in succession to traverse said gathering area, a cover plate for said container having an opening therethrough, means for causing the cover plate to advance with each mold as the latter traverses the gathering area, with said opening in register with the mold, and means for projecting each mold through said opening and bringing it into gathering relation to the glass while traversing the gathering area.

CLARENCE C. KINKER.